United States Patent [19]
Molis

[11] 3,752,345
[45] Aug. 14, 1973

[54] STOCK PICKER ASSEMBLY WITH SELF-CONTAINED DRIVE MEANS

[75] Inventor: Benedict Molis, Lake Villa, Ill.

[73] Assignee: Lift Parts Mfg., Inc., Elk Grove Township, Ill.

[22] Filed: Aug. 5, 1971

[21] Appl. No.: 169,242

[52] U.S. Cl............ 214/515, 214/84, 296/35 A, 193/35 B, 193/35 C
[51] Int. Cl............................................. B60p 1/52
[58] Field of Search............................. 214/515, 84; 193/35 R, 35 B, 35 C; 296/35 A

[56] References Cited
UNITED STATES PATENTS

| | | | |
|---|---|---|---|
| 3,648,869 | 3/1972 | Christianson | 214/515 |
| 1,563,863 | 12/1925 | Joyner | 214/84 |
| 2,949,992 | 8/1960 | Weinberg | 214/84 X |
| 3,473,679 | 10/1969 | Weichel | 214/515 X |
| 703,990 | 7/1902 | Burton | 214/515 |
| 2,019,656 | 11/1935 | Corby et al. | 214/515 |

*Primary Examiner*—Albert J. Makay
*Attorney*—Kegan, Kegan & Berkman

[57] ABSTRACT

A motor-driven truck adapted for use as a prime mover and including means for engaging and for supporting and propelling an auxiliary conveyance such as a cart, the truck including a frame-carried friction-reducing bed defining a support base for the cart bearing thereupon, and means for positioning the cart on the truck for transport thereby.

7 Claims, 9 Drawing Figures

Patented Aug. 14, 1973
3,752,345
3 Sheets-Sheet 1
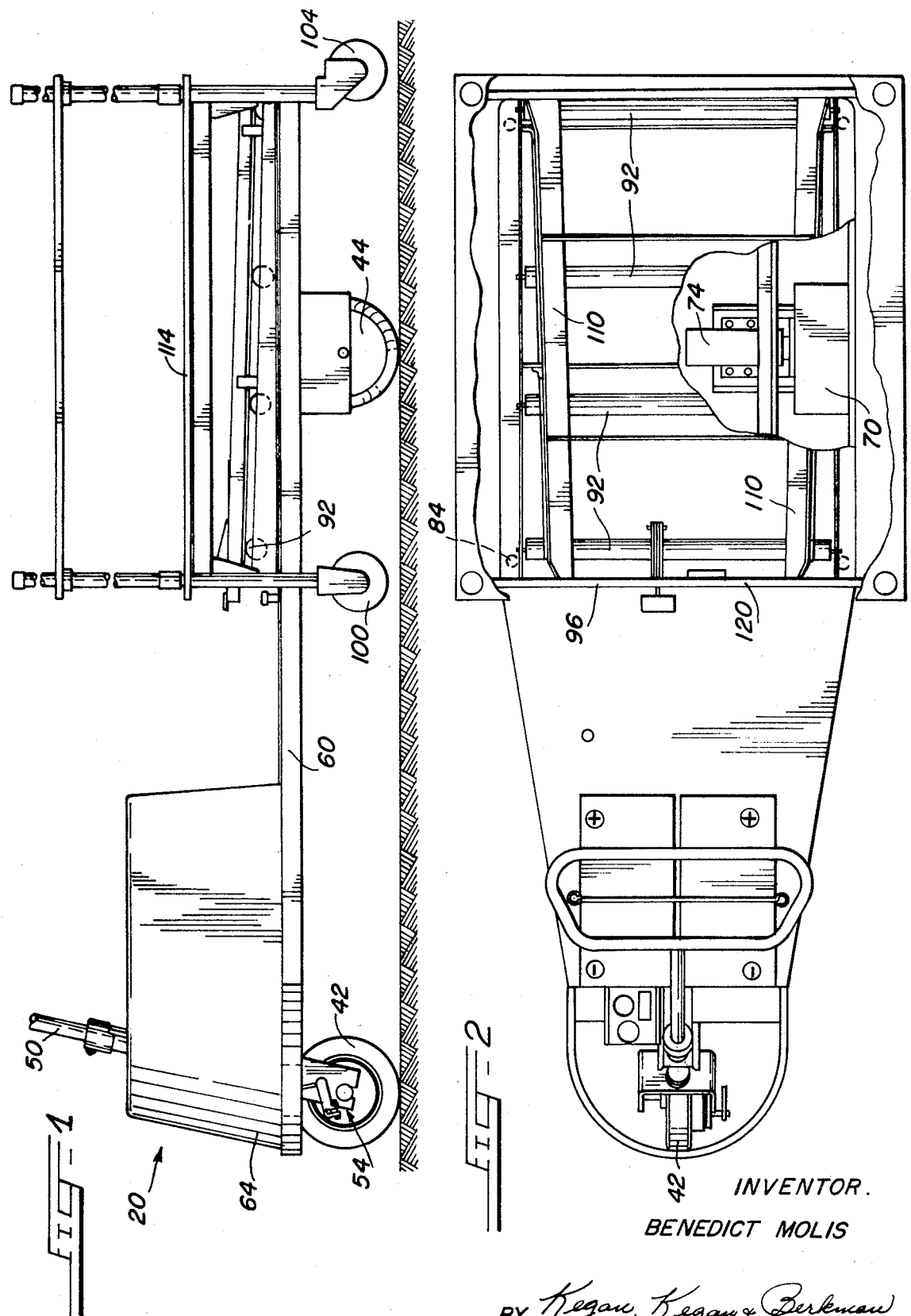
INVENTOR.
BENEDICT MOLIS
BY Kegan, Kegan & Berkman
ATTYS 3,752,345
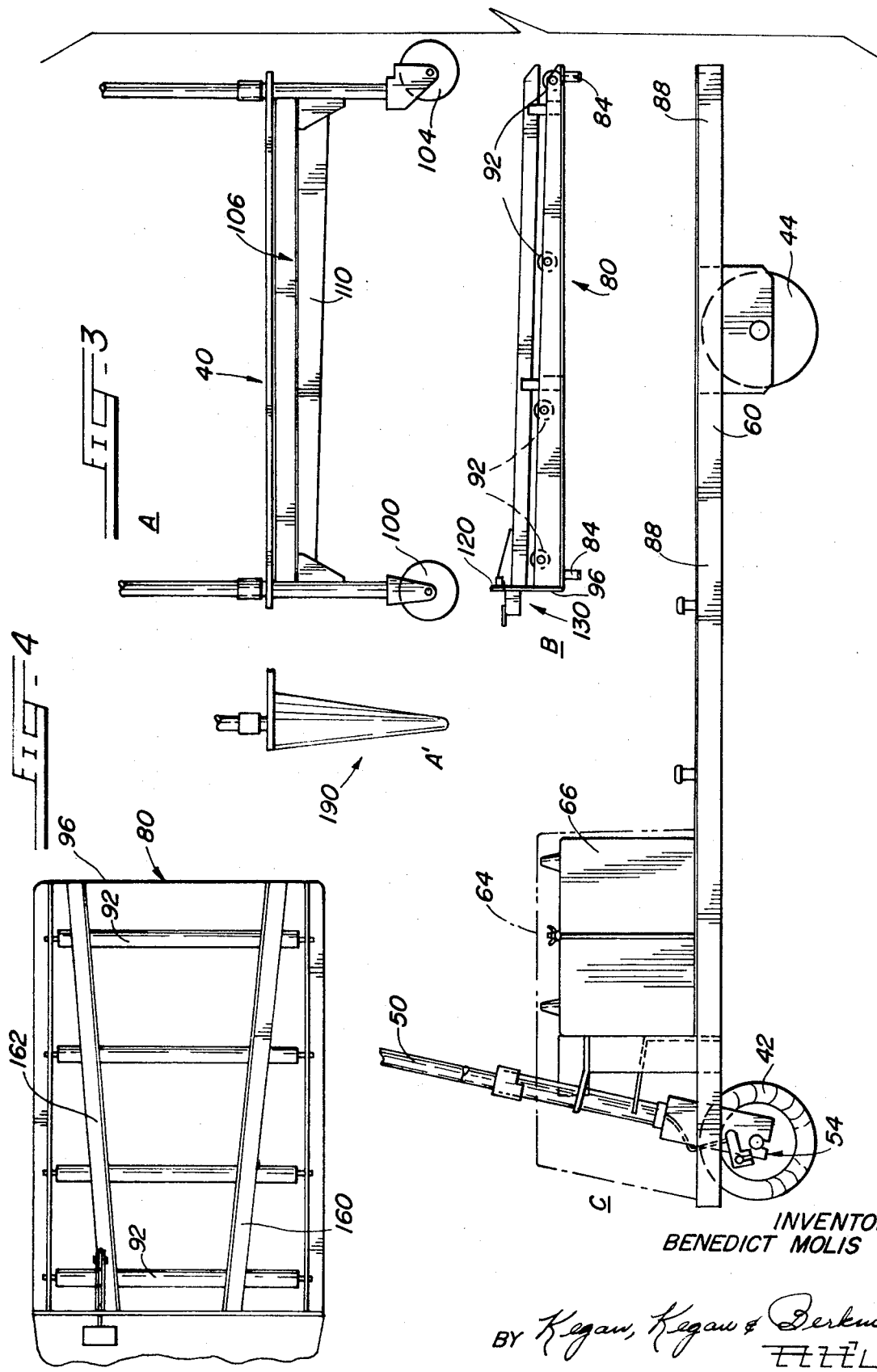

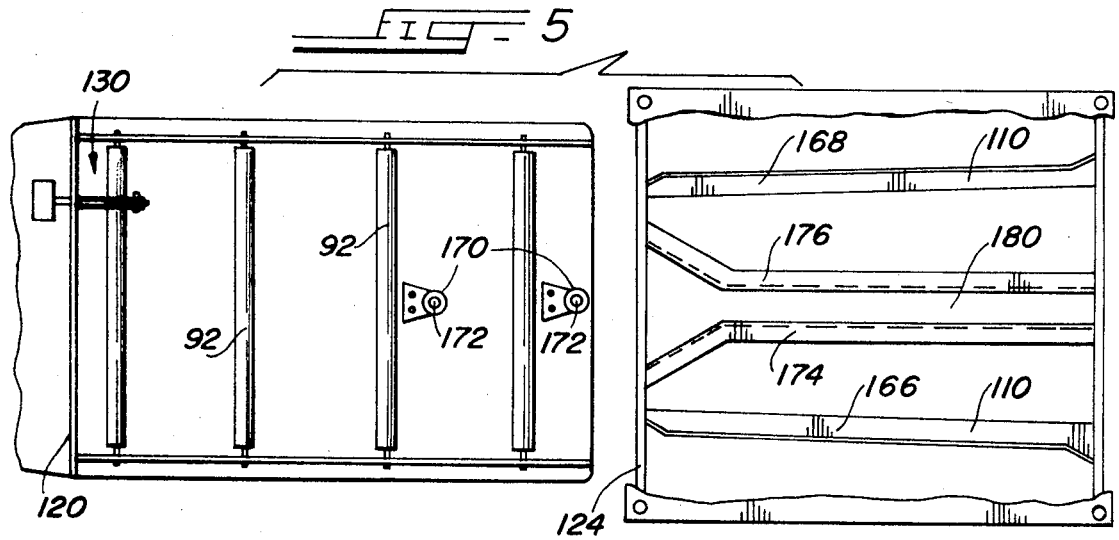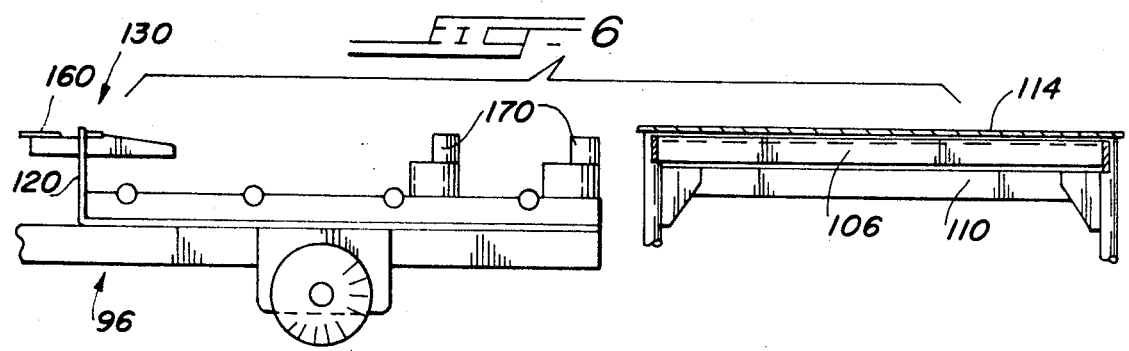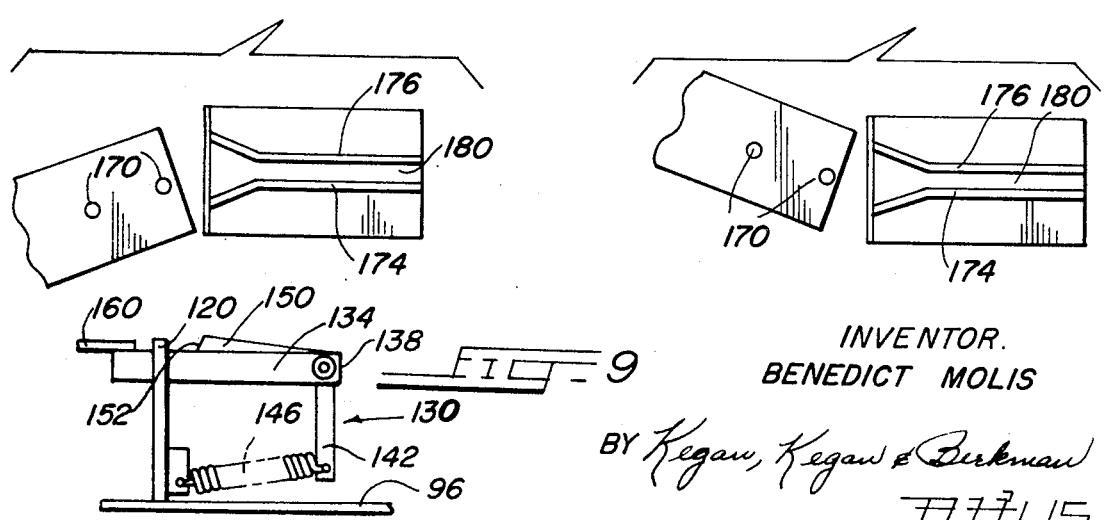
INVENTOR.
BENEDICT MOLIS

STOCK PICKER ASSEMBLY WITH SELF-CONTAINED DRIVE MEANS

This invention relates to an improved motor-driven truck adapted to carry and transport an auxiliary conveyance such as a wagon or cart. More particularly, the invention is directed to a self-propelled truck which includes a friction-reducing load-supporting bed uniquely constructed and adapted to engage with and to elevate thereupon an auxiliary conveyance such as a cart, the latter then being carried along with a truck. In a specific preferred embodiment the invention is directed to providing an improved method for "stock picking" and for transporting goods in a warehouse or inventory storing establishment.

The day-to-day and hour-to-hour filling of orders from the stock shelves of warehouses and similar storage buildings or areas has long been a troublesome problem. Many and varied procedures and techniques have been employed, but none has proven completely satisfactory in all respects. In relatively small stock areas, it has been possible to select the required articles from storage shelves or racks and to deposit these in a hand-carried basket. In the case of cumbersome or heavy articles, it has been expedient for a stock man to pull a cart or wagon and to deposit the required articles on that vehicle. While the simple procedures described above may have been useful in the past, the warehouses and storage depots presently being erected cover very large areas, often in the range of an acre or more. As a result, walking "stock pickers" have given way to mechanized trucks and propelled carts. It is to such improved vehicles and auxiliary equipment that the present invention is directed.

In some of the mechanized structures presently in use for stock picking purposes and for related applications, the motorized or mechanically energized vehicle includes, as an integral component thereof means in the form of racks, bins, or shelves on which the articles selected from stock are placed. It will be appreciated that in such arrangements there is a one-to-one correspondence between the motorized vehicle and the bin or shelf-carrying component. As a result, the mechanized component is tied up for the entire period during which the stock picking operation is being carried out. In many instances, this tie-up of equipment is highly objectionable and may be unnecessary.

For many stock retrieval or picking procedures, the items to be removed from the storage shelves for a particular order may be in a relatively well-defined storage area. In such cases, while a certain degree of mobility is desirable, it is not at all necessary that the step-by-step selection and accumulation of the required items be carried out through the use of a mechanized vehicle. A wheeled cart manually maneuverable may be completely adequate for such uses. When the required selections have been removed from the shelves and incorporated on such a cart, it may then be necessary either to bring that cart to the packing and shipping area or to a second loading zone so that additional items may be placed on the cart to complete an order. In either such instance, it is highly desirable that there be available a prime mover or truck which is adapted to retrieve and bring the loaded cart to the next desired zone. It is an important feature of the present invention that there is provided an improved prime mover or mechanized vehicle which includes mechanical elements highly useful in effecting a coupling and interengagement between the prime mover and the stock picking cart so that the latter may be connected to and transported by means of the prime mover to any desired location.

It is a related feature of the invention that there is provided a truck or prime mover which is self-powered and which may be moved from place to place within a given plant or area, as required, and which is adapted to engage and transport a cooperating conveyance or cart from place to place as needed.

It is an important feature of the invention that there is provided a truck or prime mover which includes an upper surface or bed having rollers or other antifriction means to facilitate the placement of a load in the form of a cart or the like on the truck for transport thereby.

Yet another important feature of the present invention is that the truck is versatile, being adapted to carry and transport any of a plurality of different types of conveyances or carts, each designed for a specialized use, as may be required.

An important aspect of the invention is to provide a load conveyance system in which the truck or prime mover is effective physically to elevate a cooperating cart thereupon without use of associated hydraulics or levers.

Other objects and advantages of the invention, together with certain details of the construction and the intercooperation of the various components will be apparent from the following description taken in conjunction with the drawings in which:

FIG. 1 is a side elevational view of a truck and associated conveyance supported thereon, in accordance with the present invention;

FIG. 2 is a top plan view of the assembly shown in FIG. 1, with certain parts broken away to reveal structures therebeneath;

FIG. 3 is an exploded view of an embodiment of the invention including a self-propelled truck, a friction-reducing frame or bed adapted for securement on the truck, and a cart adapted for support on the truck-carried bed;

FIG. 4 is a top plan view of the friction-reducing bed shown in FIG. 3B;

FIG. 5 is a top plan view illustrating somewhat schematically one embodiment of a truck-carried friction-reducing bed, and the understructure of a cooperating cart adapted to override and bear upon the truck-carried bed;

FIG. 6 is a side elevational view of the assembly of FIG. 5 showing one form of truck-carried guide rollers adapted to enter between cooperating cart-centering and aligning guide bars;

FIG. 7 is a diagrammatic top plan view indicating the mode of interengagement of truck-carried roller elements with cooperating guide bars of the truck-carried cart, as the truck and cart approach one another at an angle;

FIG. 8 is a view similar to FIG. 7 but indicating the mode of interengagement between the truck and the cart from a different approach angle; and FIG. 9 is an enlarged view showing details of the coupling means for holding the conveyance or cart in place on the truck, in accordance with one embodiment of the invention.

The present invention provides an improved system of load handling and product distribution and collection. The cart or conveyance on which the articles are loaded or from which they are distributed operates in conjunction with low friction means carried by the associated truck whereby the cart is automatically engaged with, coupled to and carried upon the truck without any need for hydraulic mechanisms or their mechanical lever counterparts or equivalents.

In a preferred embodiment of the invention, the interengagement or intercoupling of the truck with the cart is facilitated through the use of antifriction rollers which are carried at an upper surface of the truck and which may be detachably mounted as an auxiliary assembly or bed. The low friction roller bed carried by the truck frame is preferably inclined upwardly from rear to front to facilitate elevation of the cart during its advance onto the truck. In a preferred arrangement, in its final position on the truck, the cart has been lifted upwardly and clears the supporting floor. In a preferred embodiment of the invention, the weight supporting understructure of the cart is pitched at an angle which is essentially the counterpart of the angle defined by the low friction bed of the truck so that, when fully engaged upon the truck, the floor of the cart will be essentially level or parallel to the supporting substrate upon which the truck travels.

It is within the concept of the present invention that, in an alternative arrangement, the cart may be engaged upon and coupled to the truck so that only a portion of the total weight of the cart is carried by the truck, the remaining load being carried by the rear wheels of the cart itself as the truck pulls the cart along.

The aims and objects of the invention are accomplished by providing an assembly which includes three cooperating principal components: a powered truck, a low friction bed mounted on the truck, and a cart or conveyance adapted to ride upwardly upon and to engage and lock into position on the truck.

Referring more particularly to the drawings, there is shown in FIGS. 1-4, for the purpose of illustrative disclosure, a preferred embodiment of the truck and cart assembly of the invention, incorporating the teachings thereof.

As shown, the assembly includes a motor-driven truck 20, a low friction bed mounted on the truck, and a cart or similar conveyance 40 adapted to ride upwardly upon the bed of the truck 20 whereby the cart may be transported from place to place by means of the truck. The truck itself, in the embodiment illustrated, is of the three-wheeled type including a front steering wheel 42 and a pair of rear wheels 44. A steering post 50 provided with suitable antifriction bearings is connected to the front wheel 42 and the wheel is provided with a suitable brake band and actuator assembly 54 of conventional construction. The truck frame 60 carries at its forward end a compartment or casing 64 which houses electrical storage batteries 66.

An electric motor 70 is coupled to one of the rear truck wheels 44 through a reduction train of a gearing 74, the motor 70 being energized by the batteries 66, power being transmitted through electrical cables (not shown). A differential of conventional design (not shown) completes the drive mechanism.

In a preferred embodiment of the invention, a friction-reducing bed 80 is mounted on the frame 60 of the truck 20. Any preferred means of attachment may be used, but in the specific embodiment illustrated in FIG. 3, the bed 80 includes downwardly extending stub shafts or bosses 84 which extend into and seat in corresponding ports or recesses 88 formed in the frame 60 of the truck 20, as indicated in FIGS. 2 and 3.

As seen most clearly in FIGS. 2 and 3B, the friction-reducing bed 80 carries an array of rotatably mounted rollers 92 secured at positions spaced longitudinally along the load-carrying frame 96 of the bed 80, the rollers 92 having rotational axes extending transversely of the length of the frame 96. It is an important feature of a preferred embodiment of the invention that the upper extremities of the rollers 92 define a load-carrying plane sloping generally upwardly as viewed from the rear forwardly of the bed 80 and the truck 20. In the specific embodiment of the invention illustrated, the over-all difference in elevation between the first or most rearward roller and the roller at the forward end of the bed is about three-fourths of one inch.

Referring now to FIG. 3A, there it is shown one preferred embodiment of the cart or conveyance 40 used in conjunction with the truck 20 and the friction-reducing bed 80 of the invention. As shown, the cart 40 is a wheel-supported vehicle including a pair of "fixed" or non-pivotal front wheels 100 and a pair of swivel wheels 104. It is within the inventive concept that the truck itself may take any preferred design and may be adapted for any particular preferred use. That is, the truck itself may carry shelves, brackets, or bins, or may, if desired, be fitted with racks or other special structural components. Any of these carts or conveyances may be used with the same prime mover or truck.

Secured to the cart 40 on the underside of the frame 106 are a pair of longitudinally extending laterally spaced weight-supporting L-bars 110. As seen most clearly in FIG. 3A, the L-bars 110 are pitched downwardly from front to rear of the cart, the angle or degree of pitch corresponding essentially to the pitch of the rollers 92 carried by the friction-reducing bed 80. It will be appreciated, as illustrated in FIG. 1, that the above-described relationship ensures that the cart 40, when transported on the truck-carried bed 80 will have its floor 114 disposed horizontally. In the preferred embodiment of the assembly illustrated in FIG. 1, when the cart 40 is positioned in place on the truck 20, the cart wheels ride clear of the substrate which the truck traverses.

The manner in which the cart 40 is brought into position on the truck 20 will be appreciated upon consideration of FIGS. 1 and 3. With the friction-reducing bed 80 keyed onto the frame 60 of the truck 20, the truck 20 is propelled rearwardly and guided to enter between the front wheels 100 of the cart 40. As the truck 20 continues to move rearwardly, the rollers 92 of the bed 80 engage the under side of the L-bars 110 of the cart 40 and the cart 40 is lifted from the floor and onto the truck 20.

The inertia of the cart 40 is sufficient to provide that degree of immobility or resistance to movement necessary to permit the motor-driven truck 20 to slide beneath the cart 40, engage the underside of the cart, and elevate the cart onto the truck 20. The frame 96 of the roller bed 80 is provided with a stop plate 120 against which the forward framing bar 124 of the cart 40 abuts at the point of full travel of the cart 40 onto the bed 80. A latch assembly 130 is provided to secure the cart 40 in place. As best seen in FIG. 9, the assembly 130 includes a latch bar 134 pivotally supported on a shaft 138, the bar being biased to an elevated position through a link 142 and an associated spring 146. The latch bar 134 carries a wedge-shaped detent 150, a vertical face or edge 152 of which acts as an abutment face or limit to preclude rearward sliding movement of the cart on the friction-reducing bed 80. In order to effect the release of the cart it is necessary merely to apply downward pressure to a foot pedal plate 160 secured to the free end of the latch bar 134. The detent 150 is thereby depressed and a path is cleared for release and rearward displacement of the cart 40. It will be appreciated that many other types of retention means may be used.

In order to ensure accurate and stable lateral positioning or placement of the cart on the friction-reducing bed 80, the latter is provided with a pair of rails or guide bars 160 and 162, mounted on the frame 96 of the bed and diverging from front to rear. (See FIG. 4). A pair of cooperating guides 166 and 168 is provided on the under surface of the cart 40, these guides also diverging from front to rear of the cart and being spaced laterally so as to be received within and proximate to the guide bars 160 and 162 of the friction-reducing bed 80. In a preferred embodiment of the invention, the guides 166 and 168 may be identical with or constitute the load-carrying L-bars 110. It will be appreciated upon consideration of the structure illustrated in FIG. 2, that the angularly disposed bars associated with the bed and with the cart ensure proper placement of the cart 40 as it bears upon and overrides the bed 80.

An alternative arrangement for ensuring correct lateral locating or positioning of the cart on the bed is illustrated schematically in FIGS. 5–8. As shown, the friction-reducing bed 80 is provided with a pair of longitudinally spaced rollers 170 each freely rotatable about a vertical shaft 172 secured to the substructure. As the cart 40 overrides the truck 20, the rollers 170 enter between a laterally spaced pair of guide rails 174 and 176 which converge rearwardly to define a guide channel 180, the lateral width of which is only slightly greater than the outer diameter of the rollers 170. The functioning of this particular alignment system is indicated schematically in FIGS. 7 and 8.

While the present invention has been described with respect to preferred embodiments, it will be appreciated that many changes may be made without departing from spirit of the invention, all such variations coming within the scope of the appended claims. For example, the cart used in conjunction with the truck has been described as including a four-wheeled carriage. For some application, particularly where there is no need to transport the cart manually, the cart may include two wheeled supports and two posts 190. Such posts, used instead of one pair of wheels impart additional stability and immobility to the cart as the truck approaches and engages the cart. In the specific embodiments of the invention described, the friction-reducing bed 80 has been illustrated as constituting a separate structure adaptable to interengage with and bear upon the supporting truck. It will be appreciated that, if preferred, the low-friction bed 80 may be made an integral part inseparable from the truck itself. It will also be appreciated that while the longitudinal array of transversely extending rollers 92 has been described as associated with the truck rather than the cart, the actual disposition of the rollers 92 may be reversed. For reasons or economy, the arrangement described hereabove is preferred. Clearly, balls seated in sockets may be substituted for the cylindrical rollers 92.

While disclosures of preferred embodiments of the apparatus and of preferred techniques for assembly have been provided, it will be apparent that numerous modifications and variations thereof may be made without parting from the underlying principles of the invention. It is, therefore, desired by the following claims to include within the scope of the invention all such variations and modifications by which substantially the results of this invention may be obtained through the use of substantially the same or equivalent means.

What is claimed is:

1. The combination with a motor-driven truck including a wheel-mounted, load-supporting and carrying frame provided with steering means, motor means operatively coupled to a wheel of said truck to propel said truck along a surface to be traversed by said truck, and roller means carried on said truck at an upper support surface thereof and operative to engage with a cart to be supported thereon to facilitate slidably advancing the cart lengthwise onto said frame for support thereon, said roller means are disposed in an array extending lengthwise of said frame, tangents at upper surfaces of said roller means defining a support plane sloping upwardly as viewed from the rear forwardly of said frame of said truck, whereby in moving said cart from a self-supporting position to a position of at least partial support on said truck, said cart engages said roller means and rides therealong, at least a portion of said cart being thereby elevated to clear the surface along which said truck is propelled, of a cart having independent and fixed supports, said cart being adapted to engage said roller means and to bear and ride thereon to assume a supported position on said frame of said truck, said cart including a forwardly disposed pair of support elements laterally spaced so as to straddle said frame of said truck as said cart rides forwardly upon and surmounts said truck, whereby at least a forward portion of said cart bears upon and spans said frame to be carried free of the surface along which said truck is propelled.

2. The combination as set forth in claim 1 wherein said roller means comprises a plurality thereof secured at positions spaced longitudinally along said load-carrying frame and having rotational axes extending transversely of the length of said frame, upper surfaces of said roller means being exposed for engagement with an undersurface of said cart, whereby said cart rides on said roller means as said cart moves forwardly relatively to said frame to assume a supported position on said truck.

3. The combination as set forth in claim 2 wherein said roller means are generally cylindrical rollers arranged with axes paralleling one another and arrayed to lie transversely of a front-to-rear direction of said frame.

4. The combination as set forth in claim 1 and further comprising laterally spaced substantially parallel cart-locating guide rails extending lengthwise of said truck, and guide bars secured to an undersurface of said cart and extending lengthwise thereof, said guide rails adapted slidably to abut and bear against said guide bars, whereby in advancing said cart to override, bear upon, and surmount said truck, said bars in cooperation with said rails define a guide way facilitating and ensuring proper relative lateral placement of said cart on said truck to establish a physically stable assembly.

5. The combination as set forth in claim 1 and further comprising selectively operable latching means releasably securing said cart to said truck to preclude inadvertent separation therefrom.

6. The combination as set forth in claim 1 and further comprising latching means securing said cart to said truck, and wherein said latching means is effective, in its interengaging position with said cart, to prevent said cart from sliding rearwardly along the downwardly sloping support plane and wherein gravitational forces acting upon said cart when said latching means is released are effective to facilitate sliding dislodgment of said cart and travel of said cart downwardly along the sloping plane to free said cart from said truck.

7. The combination as set forth in claim 1 wherein said roller means comprise a frame-carried roller assembly readily removable from said truck and including intercoupling means for securement of said roller assembly on said truck.

* * * * *